United States Patent
Surnov et al.

(10) Patent No.: US 10,861,113 B2
(45) Date of Patent: Dec. 8, 2020

(54) METHOD AND SYSTEM FOR MONITORING THE PARAMETERS OF THE ENERGY RESOURCES CONSUMPTION PROCESS

(71) Applicants: Sergey Surnov, Korolyov (RU); Igor Bychkovskiy, Moscow (RU); Grigory Surnov, Korolyov (RU); Sergey Krasnov, Studio City, CA (US)

(72) Inventors: Sergey Surnov, Korolyov (RU); Igor Bychkovskiy, Moscow (RU); Grigory Surnov, Korolyov (RU); Sergey Krasnov, Studio City, CA (US)

(*) Notice: Subject to any disclaimer, the term of this patent is extended or adjusted under 35 U.S.C. 154(b) by 219 days.

(21) Appl. No.: 16/123,789

(22) Filed: Sep. 6, 2018

(65) Prior Publication Data
US 2020/0082479 A1 Mar. 12, 2020

(51) Int. Cl.
*G06F 11/30* (2006.01)
*G06Q 50/06* (2012.01)
(Continued)

(52) U.S. Cl.
CPC ............. *G06Q 50/06* (2013.01); *G06F 9/542* (2013.01); *H04L 12/2803* (2013.01);
(Continued)

(58) Field of Classification Search
CPC ...................................................... H04W 4/70
See application file for complete search history.

(56) References Cited

U.S. PATENT DOCUMENTS

| | | | |
|---|---|---|---|
| 7,356,548 B1 * | 4/2008 | Culp | H04L 67/125 |
| 2012/0271465 A1 * | 10/2012 | Zobrist | G05D 23/1917 |
| | | | 700/282 |
| 2015/0019027 A1 * | 1/2015 | Acker | G05D 23/19 |
| | | | 700/282 |

* cited by examiner

*Primary Examiner* — Phuong Huynh
(74) *Attorney, Agent, or Firm* — Vera Chernobylsky; Law Offices of Vera Chernobylsky

(57) ABSTRACT

The invention relates to the field of the Internet of things (IoT) and allows to remotely control the energy resource consumption parameters (electricity, cold and hot water, heat energy and gas) in the communal field. The controlled parameters include the amount of energy resources received from each source of resources, their quality (water, coolant or gas temperature, pressure in the water or gas pipeline, availability of power from the grid, peak voltage, RMS voltage, frequency deviation, distortion of the current waveform), as well as environmental parameters (temperature and composition of ambient air, air humidity, the smoke presence, opening and closing of doors and windows, the presence of moving objects, illumination, water leakage, gas leakage). The developed method and the system implementing it allow registering the value of each monitored parameter in real time mode at the moment this parameter is changed by a certain predefined value and automatically transfer this value to the Monitoring Center. Data accumulated in the Monitoring Center is Big Data containing detailed information on the quantity and quality of energy resources consumed, the state of the data collection system itself, and the behavior of people in the consumption of energy resources. These data can be used to develop recommendations for energy saving, changing consumers' behavior to save energy, as well as to monitor the operation of the system and the location of accidents and leaks.

The invention can be used to create centralized automatic monitoring systems for energy resource consumption in areas of any size.

18 Claims, 1 Drawing Sheet

(51) Int. Cl.
*H04Q 9/02* (2006.01)
*H04L 12/28* (2006.01)
*G06F 9/54* (2006.01)
*H04L 12/26* (2006.01)
*H04W 4/70* (2018.01)

(52) U.S. Cl.
CPC ............... *H04L 43/04* (2013.01); *H04Q 9/02* (2013.01); *H04W 4/70* (2018.02); *H04Q 2209/40* (2013.01); *H04Q 2209/60* (2013.01); *H04Q 2209/823* (2013.01); *H04Q 2209/826* (2013.01)

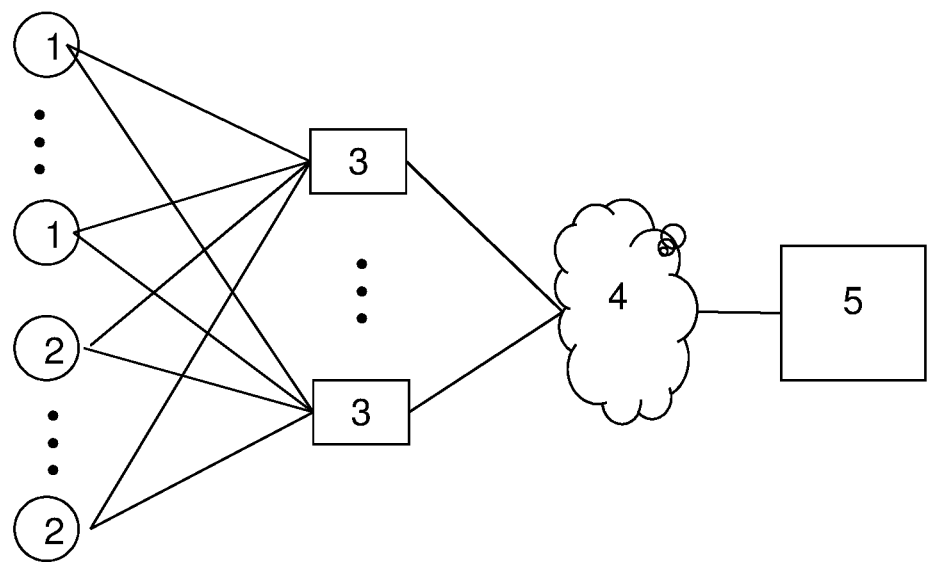

METHOD AND SYSTEM FOR MONITORING THE PARAMETERS OF THE ENERGY RESOURCES CONSUMPTION PROCESS

The invention relates to the field of the Internet of things (IoT) and allows to remotely control the energy resource consumption parameters (electricity, cold and hot water, heat energy and gas) in the communal field. The controlled parameters include the amount of energy resources received from each source of resources, their quality (water, coolant or gas temperature, pressure in the water or gas pipeline, availability of power from the grid, peak voltage, RMS voltage, frequency deviation, distortion of the current waveform), as well as environmental parameters (temperature and composition of ambient air, air humidity, the smoke presence, opening and closing of doors and windows, the presence of moving objects, illumination, water leakage, gas leakage). The developed method and the system implementing it allow registering the value of each monitored parameter in real time mode at the moment this parameter is changed by a certain predefined value and automatically transfer this value to the Monitoring Center. Data accumulated in the Monitoring Center is Big Data containing detailed information on the quantity and quality of energy resources consumed, the state of the data collection system itself, and the behavior of people in the consumption of energy resources. These data can be used to develop recommendations for energy saving, changing consumers' behavior to save energy, as well as to monitor the operation of the system and the location of accidents and leaks.

The invention can be used to create centralized automatic monitoring systems for energy resource consumption in areas of any size.

Classifications
G01D4/002
Y02B90/241
Y04S20/32
H04Q2209/40
H04Q2209/10
H04Q2209/60
H04Q2209/70
H04Q2209/823
H04Q2209/826
H04Q2209/86
G06Q50/06
Y02B90/246
Y02B90/2607
Y04S20/34
Y04S20/36
Y04S20/42
Y04S40/126
Y04S40/14

BACKGROUND

The sources of the values of the monitored parameters in the remote monitoring system are the meters of consumed energy resources and the sensors of the environmental parameters.

The centralization of data collection leads to a number of important consequences:

1) meters and sensors become part of a monitoring system which includes a Monitoring Center remotely collecting data on energy resource consumption;

2) the design of meters and sensors should allow their integration into the monitoring system. In this connection, the concept of "smart" meters has appeared, which at least implies the availability of remote reading of their data;

3) a large number of meters and sensors installed in a large area requires special attention to the monitoring system operation and its security;

4) increasing the "intelligence" of meters and sensors should not lead to excessive growth in their price—anyway the consumer of energy resources will have to pay for them.

Remote monitoring of the energy resource consumption parameters is a modern trend in the field of the Internet of things (IoT). The goal is to obtain as much as possible detailed data on the resource consumption, in the ideal case—in real time. However, the technical implementation of remote collection of detailed data is a complex task.

The existing remote monitoring systems are interval. They are based on the method of polling meters and sensors at a given time interval. The shorter the set time interval, the more detailed data is collected in the Monitoring Center.

However, such systems have very significant drawbacks:

1) polling of meters and the transfer of data to the Monitoring Center are also conducted in the absence of consumption of energy resources;

2) the shorter the polling interval of meters:
the quicker stand-alone power cells in the meters and sensors discharge;
the more meters and sensors have to be polled per unit of time. The monitoring system can become sensitive to the number of meters and sensors included in it;
more traffic in the system of data transfer to the Monitoring Center.

3) Due to the two-way communication between the meters and the Monitoring Center, unauthorized access to a large number of meters and sensors and their damaging is possible. Returning them to working condition can be a complex and costly task.

SUMMARY

The object of the invention is to develop a method for remote monitoring of the energy resource consumption parameters and a system for its implementation that will:

1) transmit detailed data to the Monitoring Center only when energy resources are consumed;

2) record the moments of time when energy resources were consumed;

3) exclude the possibility of unauthorized access to meters and sensors;

4) simplify the equipment used and cut its cost.

The above problem is solved by abandoning the interval polling method and transition to the method based on events.

An event for the source of an energy resource is the receipt of a predefined amount of energy resource from it. The specified amount of energy resource is the event value for the source of the energy resource. Sources of energy resources have unique identification numbers.

The event for the environment parameter is the change of its value by the predefined value. The predefined value of the specified change is the event value for the environment parameter. Environment parameters have unique identification numbers.

When an event for the source of the energy resource occurs, a message containing the identification number of the source, the sequence number of the event and the energy resource quality indicators is transmitted. The time of message reception is recorded.

When an event occurs for the environment parameter, a message containing the identification number of the environment parameter, the sequence number of the event, and the value of the monitored environment parameter is transmitted. The time of message reception is recorded.

Calculation of the amount of energy resource that has passed through each source of energy resource is determined in the Monitoring Center on the basis of the set of messages corresponding to that source.

The amount of consumed energy resource and its consumption time are determined and data transfer to the Monitoring Center is performed only with the consumption of energy resources or changes in environmental parameters.

The problem of eliminating the possibility of unauthorized access to meters and sensors, as well as simplifying their design and reducing their cost, is solved by structural solutions in a system that implements the above method of remote monitoring of energy consumption parameters.

In the method for remote monitoring of energy resource consumption parameters according to the invention for each source of energy resource, upon receipt of a given amount of energy resource from it, a message is prepared containing the sequence number of this message and the identification number of the meter; the prepared message is transmitted over a set of data channels; for each data channel, the time of the transmitted message reception is determined; an entry containing the identification number of the meter, the sequence number of the transmitted message and the time of its receipt is added to the set of entries corresponding to the source of the resource; on the basis of the set of entries corresponding to the source of the resource, the amount of energy resource received from the given source for a given period of time is determined;

for each environment parameter, when its value changes by a predefined value, a message is prepared containing the sequence number of this message, the value of the environmental parameter and the identification number of the sensor; the prepared message is transmitted over a set of data channels; for each data channel, the time of the transmitted message reception is determined; an entry containing the identification number of the sensor, the sequence number of the transmitted message and the time of its receipt is added to the set of entries corresponding to the environment parameter.

Messages are predominantly transmitted over a set of data channels simultaneously.

Sets of entries corresponding to the sources of the resource and containing entries of the form {meter identification number, sequence number of the transmitted message, time of receipt of the transmitted message} contain information characterizing the receipt of energy resources from each source of the resource over time.

Sets of entries corresponding to the environment parameters and containing entries of the form {sensor identification number, environment parameter value, sequence number of the transmitted message, time of receipt of the transmitted message} contain information characterizing changes in the environmental parameters over time.

The amount of energy resource received from the given source for a given period of time is determined by the formula $C \times (K_2 - K_1)$, where C is the predefined amount of energy resource for the given energy source, at the consumption of which the message is transmitted; $K_1$ is the sequence number of the message corresponding to the beginning of the given period of time, and determined on the basis of the set of entries corresponding to that source; $K_2$ is the sequence number of the message corresponding to the end of the given period of time, and determined based on the set of entries corresponding to that source.

The sequence numbers of the messages $K_1$ and $K_2$ are determined by interpolating the dependence of the message numbers on the time given by the set of entries corresponding to the given source of the energy resource, while linear interpolation is predominantly used.

BRIEF DESCRIPTION OF THE DRAWINGS

FIG. 1. Structure of the remote monitoring system for energy resource consumption parameters.

PREFERRED EMBODIMENT OF THE INVENTION

The above method is implemented by the remote monitoring system for energy resource consumption parameters.

The remote monitoring system (FIG. 1) consists of meters 1 of the amount of a certain energy resource mounted on energy resource sources (not shown in FIG. 1), environmental parameter sensors 2 connected by radio communication with concentrators 3 that are connected via a communication network 4 to the Monitoring Center 5.

Before the start of operation of each energy resource meter 1 and each environment parameter sensor 2, the initial values of the internal counters of messages sequence numbers is set to zero therein.

To monitor the parameters of energy resource consumption each meter 1 mounted on the source of the energy resource determines the amount of energy resource consumed and, when consuming a predefined amount of energy resource, increases the message's sequence number by one; by means of radio communication, transmits to at least one of the concentrators 3 its identification number (source number of the energy resource) and the message sequence number;

each sensor 2 of the environment parameter determines the value of the environment parameter and, when the value of the environment parameter changes, increases the message's sequence number by one; by means of radio communication, transmits to at least one of the concentrators 3 its identification number (the environment parameter number), the message sequence number and the environment parameter value.

Predominantly, messages from meter 1 and sensor 2 are fed through the radio channel to several concentrators 3 simultaneously.

Predominantly, the initiator of communication between each meter 1 and concentrators 3 is meter 1.

Predominantly, the initiator of communication between each sensor 2 and concentrators 3 is sensor 2.

Predominantly, the radio communication between meters 1 and concentrators 3 is one-way (from meters 1 to concentrators 3).

Predominantly, the radio communication between sensors 2 and concentrators 3 is one-way (from sensors 2 to concentrators 3).

The use of one-way radio communication ensures a high level of security in the system and excludes unauthorized access to meters 1 and sensors 2.

Each of concentrators 3 that received the message transmitted by meter 1 or sensor 2 determines the time it was received; transmits to the Monitoring Center 5 via the communication network 4 a message received from meter 1 or sensor 2 and the time of receipt of this message.

Predominantly, the initiator of communication between each concentrator 3 and the Monitoring Center 5 is concentrator 3.

For organization of the communication network 4, the Internet (via Ethernet, Wi-Fi, WiMAX), the mobile communication network (3G, 4G, 5G, LTE, GPRS, NB IoT), other communication networks (LoRaWAN, NB FI) can be used between concentrators 3 and the Monitoring Center 5.

Monitoring Center 5 ensures that the information received from concentrators 3 is stored in the database. The receipt of the energy resource from a given source for a given period of time is determined by the formula $C \times (K_2 - K_1)$, where C is the predefined amount of energy resource upon receipt of which the message is sent corresponding to a given source of energy resource; $K_1$ is the sequence number of the message corresponding to the beginning of the given period of time, and determined on the basis of entries of the database corresponding to that source; $K_2$ is the sequence number of the message corresponding to the end of the given period of time, and determined on the basis of entries of the database corresponding to that source.

The sequence numbers of messages $K_1$ and $K_2$ are determined on the basis of a complex analysis of database entries corresponding to a given source of energy resource. The use of complex analysis in combination with a variety of channels for transmitting messages from sensors to the terminal allows reliable operation of the system.

Predominantly, linear interpolation of the dependency of the sequence numbers of messages on time is applied to determine the sequence numbers of messages $K_1$ and $K_2$.

Predominantly, when the energy resource comes from the relevant source, meter 1 determines the amount g of energy resource received; increases the internal counter G of the amount of energy resource received by g; compares the value of the internal counter G with the predefined amount C of the energy resource and, if the internal counter G is greater than or equal to the predefined amount C of the energy resource, reduces the internal counter G of the amount of energy resource received by a predefined amount C of the energy resource, prepares and sends corresponding message. In this case, before starting the operation of meter 1, the initial value of the internal counter G of the amount of energy resource received is set to 0.

Each of concentrators 3 can be equipped with a storage device and can store therein the data received from meters 1 and sensors 2, predominantly, until the transfer of the stored data to Monitoring Center 5 or until confirmation by Monitoring Center 5 of the successful transmission of this data or until subsequent messages are received.

Each of concentrators 3, when transmitting to Monitoring Center 5 the information received from meter 1 or sensor 2 and the time of receiving this information, can additionally transmit its identification number.

Predominantly, the clocks of concentrators 3 are synchronized by means of signals from Monitoring Center 5, transmitted over communication network 4.

Also, the clocks of concentrators 3 can be synchronized using the signals from the navigation systems (GPS, GLONASS, Galileo, BDS, NAVIC, QZSS) or cellular network signals.

Meters 1 and sensors 2, when transmitting messages to concentrators 3 can include additional information about their status in the message (battery charge, information about attempts to open its case, exposure to a magnetic field) and the characteristics of energy resources and their sources (temperature of water, coolant or gas, pressure in the water or gas pipeline, the presence of mains power, peak voltage, RMS voltage, frequency deviation, distortion of the current waveform).

Each meter 1 and sensor 2, when changing its status (opening the case, exposure to a magnetic field) can, without increasing the sequence number of the message, transmit a message to concentrators 3 with additional information about its status.

Concentrators 3 can also transmit additional information about their status (the presence/absence of mains power, battery or accumulator charge level, information about attempts to open the case or exposure to a magnetic field) when transmitting information to Monitoring Center 5.

Concentrators 3 are located relative to meters 1 and sensors 2 in such a way that the messages of each meter 1 and sensor 2 through the radio channel can be received by at least one concentrator 3.

The invention claimed is:

1. A method for remote monitoring of parameters of consumption of energy resources comprising:
    (a) for each source of energy resource, upon receipt of a predetermined amount of energy resource from it, a message is prepared containing the sequence number of this message and the identification number of the source of the energy resource;
    Wherein the parameters of consumption of energy resources include: temperature, composition and quality of the ambient air, smoke, humidity, opening and closing of doors and windows, movement, illumination, water or gas leakage, soil moisture, and fertilizers levels; when the value of the parameter changes to a predetermined value, a message is prepared containing the sequence number of this message, the value of the environment parameters and the identification number of the environment parameters;
    (b) the message is transmitted over one or more communication channels;
    (c) the time of receipt of the transmitted message for each data channel is determined;
    (d) the time of receipt of the message is added to the message received through each data channel;
    (e) the received messages are added to the sets of entries corresponding to the source of the energy resource or the environment parameter;
    Wherein, the amount of energy resource received from a given source of the energy resource for a given period of time is determined based on the set of entries corresponding to that source.

2. The method according to claim 1, wherein the amount of energy resource received from a given source for a given period of time is determined by the formula
    $C \times (K2-K1)$, where C is the predetermined amount of energy resource upon receipt of which the
    message is sent corresponding to a given source of energy resource; K1 is the sequence number of the message corresponding to the beginning of the given period of time, and determined on the basis of entries of the database corresponding to that source; K2 is the sequence number of the message corresponding to the end of the given period of time, and determined on the basis of entries of the database corresponding to that source.

3. The method according to claim 1, wherein the sequence number of message K1 corresponding to the beginning of the given period of time and the sequence number of message K2 corresponding to the end of the given period of time are determined by linear interpolation of the dependency of the message sequence numbers on time; wherein linear interpolation of the dependency is defined by the set of entries corresponding to a given source of the energy resource.

4. The method according to claim 1, wherein the prepared message is transmitted over several data channels simultaneously.

5. The method according to claim 1, wherein the message is further prepared and transmitted in the absence of an energy resource consumption or a change in the environment parameter value for a specified period of time from the time of transmission of the last message, without increasing the message sequence number.

6. The system for remote monitoring of energy resource consumption parameters, comprising at least one meter of an energy resource mounted on the source of the corresponding energy resource, or at least one environment parameter sensor connected through radio communication with at least one concentrator that is connected via a communication network to the Monitoring Center;
   wherein the meter of energy resource, when receiving a predetermined amount of energy resource from the source, increases the sequence number of the transmitted messages by one and transmits by radio communication a message containing the meter identification number and the message sequence number to at least one of the concentrators;
   wherein the environment parameter sensor measures the value of the environment parameter and, if the value of the environment parameter changes by a predetermined value, increases the sequence number of the transmitted messages by one, transmits by radio communication a message containing the sensor identification number, the sequence number of the transmitted message, and the measured value of the environment parameter to at least one of the concentrators; wherein each concentrator that received the message sent by the meter or sensor determines the time of its receipt, forwards the message received from the meter or sensor and the time of receipt of that message to the Monitoring Center via the communication network.

7. The system according to claim 6, wherein the initial value of the internal counter of the sequence numbers of the transmitted messages is set to 0 before the start of operation of each meter and each sensor.

8. The system according to claim 6, wherein the Monitoring Center ensures that information from each of the concentrators is stored in the database.

9. The system according to claim 8, wherein the amount of energy resource received from a given source for a given period of time is determined by the formula
   C×(K2−K1), where C is the predetermined amount of energy resource; upon receipt of predefined amount of energy resource the message is sent corresponding to a given source of energy resource; K1 is the sequence number of the message corresponding to the beginning of the given period of time, and determined on the basis of entries of the database corresponding to that source; K2 is the sequence number of the message corresponding to the end of the given period of time, and determined on the basis of entries of the database corresponding to that source.

10. The system according to claim 6, wherein at least one concentrator is equipped with a storage device and stores therein the data received from meters and sensors before the transfer of the stored data to the Monitoring Center or until the Monitoring Center confirms the fact of successful transmission of this data, or until the subsequent messages are received from meters and sensors.

11. The system according to claim 6, wherein at least one concentrator additionally transmits its identification number when transmitting to the Monitoring Center the information received from the meter or the sensor and the time of receiving this information.

12. The system according to claim 6, wherein the clocks of the concentrators are synchronized.

13. The system according to claim 6, wherein at least one meter or
   sensor transmitting a message to the concentrators includes additional information about its status in the message;
   wherein status of the message include: battery charge, information about attempts to open the sensor or meter case, exposure to a magnetic field, the temperature of the meter or sensor or temperature inside the meter or sensor, characteristics of energy resources and their sources;
   wherein the characteristics of energy resources include: temperature of water or gas, pressure in the water or gas pipeline, the presence of mains power, peak voltage, RMS voltage, frequency deviation, distortion of the current waveform.

14. The system according to claim 13, wherein at least one meter or sensor when its status changes transmits a message to the concentrators with information about their status, without increasing the sequence number of the transmitted messages.

15. The system according to claim 6, wherein at least one meter or at least one sensor transmits the message after a predetermined period of time since the last message was transmitted, without increasing the sequence number of the transmitted message.

16. The system according to claim 6, wherein at least one concentrator transmitting information to the Monitoring Center also transmits additional information about its status.

17. The system according to claim 16, wherein at least one concentrator transmits to the Monitoring Center additional information about its status after a predetermined period of time since the last transmission of information to the Monitoring Center.

18. The system according to claim 6, wherein the concentrators are positioned relative to the meters and sensors in such a way that the messages of each meter and sensor through the radio channel could be received by at least one concentrator.

* * * * *